United States Patent
Christopher

(10) Patent No.: US 9,291,146 B2
(45) Date of Patent: **\*Mar. 22, 2016**

(54) TURBINE SYSTEM AND METHOD

(71) Applicant: Verterra Energy Inc., Minneapolis, MN (US)

(72) Inventor: Theodore J. Christopher, Brooklyn Park, MN (US)

(73) Assignee: Verterra Energy Inc., Minneapolis, MN (US)

( \* ) Notice: Subject to any disclaimer, the term of this patent is extended or adjusted under 35 U.S.C. 154(b) by 76 days.

This patent is subject to a terminal disclaimer.

(21) Appl. No.: 14/146,051

(22) Filed: Jan. 2, 2014

(65) Prior Publication Data

US 2014/0110946 A1    Apr. 24, 2014

Related U.S. Application Data

(63) Continuation of application No. 13/936,269, filed on Jul. 8, 2013, now Pat. No. 8,624,420, which is a continuation of application No. 12/944,990, filed on Nov. 12, 2010, now Pat. No. 8,487,468.

(51) Int. Cl.
*F03B 13/10* (2006.01)
*F03B 3/12* (2006.01)
(Continued)

(52) U.S. Cl.
CPC ............... *F03B 13/10* (2013.01); *F03B 3/121* (2013.01); *F03B 17/063* (2013.01); *H02K 7/1823* (2013.01); *F05B 2240/97* (2013.01); *Y02E 10/223* (2013.01); *Y02E 10/28* (2013.01); *Y02E 10/38* (2013.01); *Y10T 29/49009* (2015.01);
(Continued)

(58) Field of Classification Search
CPC .......... F03B 13/10; F03B 17/068; F03D 3/04; F03D 3/061; F03D 3/0409; F03D 3/0418
USPC ............. 290/44, 54, 55, 43; 415/2.1, 4.1, 4.2, 415/4.3, 4.5, 7; 416/111, 117, 119, 132 B, 416/235
See application file for complete search history.

(56) References Cited

U.S. PATENT DOCUMENTS

| 372,148 A | \* | 10/1887 | Henderson | ..................... 415/4.2 |
| 1,027,501 A | | 5/1912 | Pearson | |
| 4,045,148 A | | 8/1977 | Morin | |

(Continued)

FOREIGN PATENT DOCUMENTS

| EP | 0 439 267 | 3/1994 |
| JP | 2005-054724 | 3/2005 |

(Continued)

OTHER PUBLICATIONS

International Search Report for Application No. PCT/US2011/058708, dated May 11, 2012, 9 pages.

(Continued)

*Primary Examiner* — Tulsidas C Patel
*Assistant Examiner* — Sean Gugger
(74) *Attorney, Agent, or Firm* — Fish & Richardson P.C.

(57) ABSTRACT

Some embodiments of a turbine system described herein provide a turbine that rotates in response to off-axis fluid flow, such as water flowing in a generally horizontal direction that is generally perpendicular to a vertical axis of rotation. The rotation of the turbine can drive a generator to output electrical energy.

20 Claims, 9 Drawing Sheets

(51) Int. Cl.
*F03B 17/06* (2006.01)
*H02K 7/18* (2006.01)
(52) U.S. Cl.
CPC ...... *Y10T 29/49236* (2015.01); *Y10T 29/49336* (2015.01)

(56) References Cited

U.S. PATENT DOCUMENTS

| | | | |
|---|---|---|---|
| 4,095,422 A | 6/1978 | Kurakake | |
| 4,289,971 A | 9/1981 | Ueda | |
| 4,368,392 A | 1/1983 | Drees | |
| 4,416,584 A | 11/1983 | Norquest | |
| 4,448,669 A | 5/1984 | Scinta | |
| 4,664,596 A | 5/1987 | Wood | |
| 4,686,376 A | 8/1987 | Retz | |
| 4,900,227 A * | 2/1990 | Trouplin | 416/132 B |
| 4,958,986 A | 9/1990 | Boussuges | |
| 5,137,417 A | 8/1992 | Lund | |
| 5,252,029 A | 10/1993 | Barnes | |
| D368,480 S | 4/1996 | Thirumalaisamy et al. | |
| D377,199 S | 1/1997 | Vermy | |
| 5,664,418 A | 9/1997 | Walters | |
| 5,971,820 A | 10/1999 | Morales | |
| 6,132,172 A | 10/2000 | Li | |
| 6,135,716 A | 10/2000 | Billdal et al. | |
| 6,448,668 B1 | 9/2002 | Robitaille | |
| 7,040,859 B2 | 5/2006 | Kane | |
| 7,108,482 B2 | 9/2006 | Chapman | |
| 7,198,470 B2 | 4/2007 | Enomoto et al. | |
| D543,495 S | 5/2007 | Williams | |
| 7,284,949 B2 | 10/2007 | Haworth | |
| D554,546 S | 11/2007 | Hart | |
| D564,042 S | 3/2008 | Roy | |
| 7,341,424 B2 | 3/2008 | Dial | |
| 7,344,353 B2 | 3/2008 | Naskali et al. | |
| 7,441,988 B2 | 10/2008 | Manchester | |
| 7,471,009 B2 | 12/2008 | Davis et al. | |
| D587,195 S | 2/2009 | Van Wijck | |
| 7,492,054 B2 | 2/2009 | Catlin | |
| 7,494,315 B2 | 2/2009 | Hart | |
| 7,498,683 B2 | 3/2009 | Landwehr | |
| D594,818 S | 6/2009 | Doucet | |
| 7,573,148 B2 | 8/2009 | Nica | |
| 7,728,454 B1 | 6/2010 | Anderson, Jr. | |
| 7,736,127 B1 | 6/2010 | Carr | |
| 7,791,214 B2 | 9/2010 | Hill | |
| D715,223 S * | 10/2014 | Pepis | D13/115 |
| 2003/0053909 A1 | 3/2003 | O'Hearen | |
| 2004/0223840 A1* | 11/2004 | Vogiatzis et al. | 415/1 |
| 2005/0169742 A1 | 8/2005 | Kane | |
| 2005/0285407 A1 | 12/2005 | Davis et al. | |
| 2006/0198724 A1* | 9/2006 | Bertony | 415/4.4 |
| 2006/0233647 A1 | 10/2006 | Saunders | |
| 2007/0258806 A1 | 11/2007 | Hart | |
| 2009/0026767 A1 | 1/2009 | Petrounevitch | |
| 2009/0047131 A1 | 2/2009 | Neumann | |
| 2009/0194997 A1 | 8/2009 | Stabins | |
| 2010/0025998 A1 | 2/2010 | Williams | |
| 2010/0148509 A1 | 6/2010 | Ortiz | |
| 2010/0276935 A1* | 11/2010 | Dehlsen et al. | 290/54 |
| 2010/0283251 A1 | 11/2010 | Reynolds | |
| 2011/0018277 A1* | 1/2011 | Brace | 290/54 |
| 2011/0309624 A1 | 12/2011 | Thuppale et al. | |
| 2012/0098262 A1* | 4/2012 | da Cunha | 290/44 |

FOREIGN PATENT DOCUMENTS

| | | |
|---|---|---|
| JP | 2007-303459 | 11/2007 |
| JP | 2010-537100 | 12/2010 |
| JP | 2011-509368 | 3/2011 |
| KR | 10-0854793 | 8/2008 |
| KR | 10-2009-0080275 | 7/2009 |
| WO | 2009/086593 | 7/2009 |
| WO | 2010/116983 | 10/2010 |

OTHER PUBLICATIONS

BioPower Systems images, Australia, 2 pages [publicly available prior to Nov. 12, 2010]. Retrieved from the Internet: <URL: http://www.biopowersystems.com/images.php>.

Dan Haugen, "Minnesota startup hopes to spin out new hydroturbine design," Midwest Energy News (Jun. 28, 2012) [retrieved on Jul. 3, 2012], at http://www.midwestenergynews.com/2012/06/28minnesota-startup-hopes-to-spin-out-new-hydroturbine-design/, 2 pages.

International Search Report and Written Opinion for Application No. PCT/US2011/058708, dated May 11, 2012, 7 pages.

Pacella, Rena Marie. 'Invention Awards: A Fish-Friendly Tidal Turbine' [online]. Popular Science, May 20, 2010, 3 pages [retrieved on Nov. 15, 2010]. Retrieved from the Internet: <URL: http://www.popsci.com/diy/article/2010-05/invention-awards-fish-friendly-tidal-turbine>.

Pelamis Wave Power, 1 page [publicly available prior to Nov. 12, 2010]. Retrieved from the Internet: <URL: http://www.pelamiswave.com/our-technology/pelamis-wec>.

Verdant Power, 2009, 2 pages [publicly available prior to Nov. 12, 2010]. Retrieved from the Internet: <URL: http://verdantpower.com/what-systemsint/>.

Japanese Office Action dated Sep. 18, 2015 for Application No. 2013-538780, 7 pages (with English Translation).

* cited by examiner

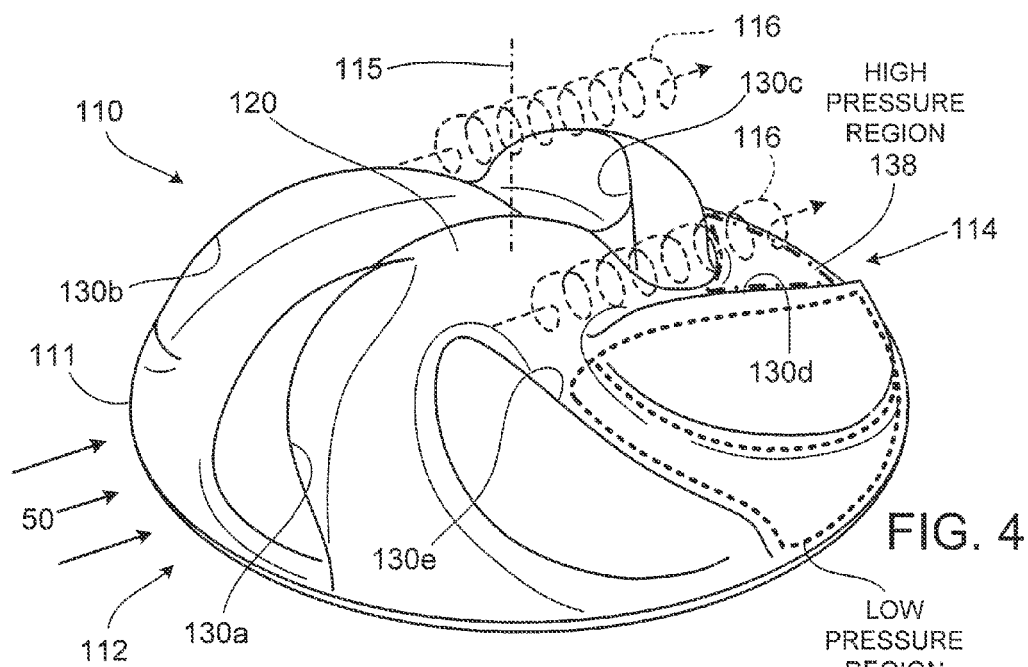
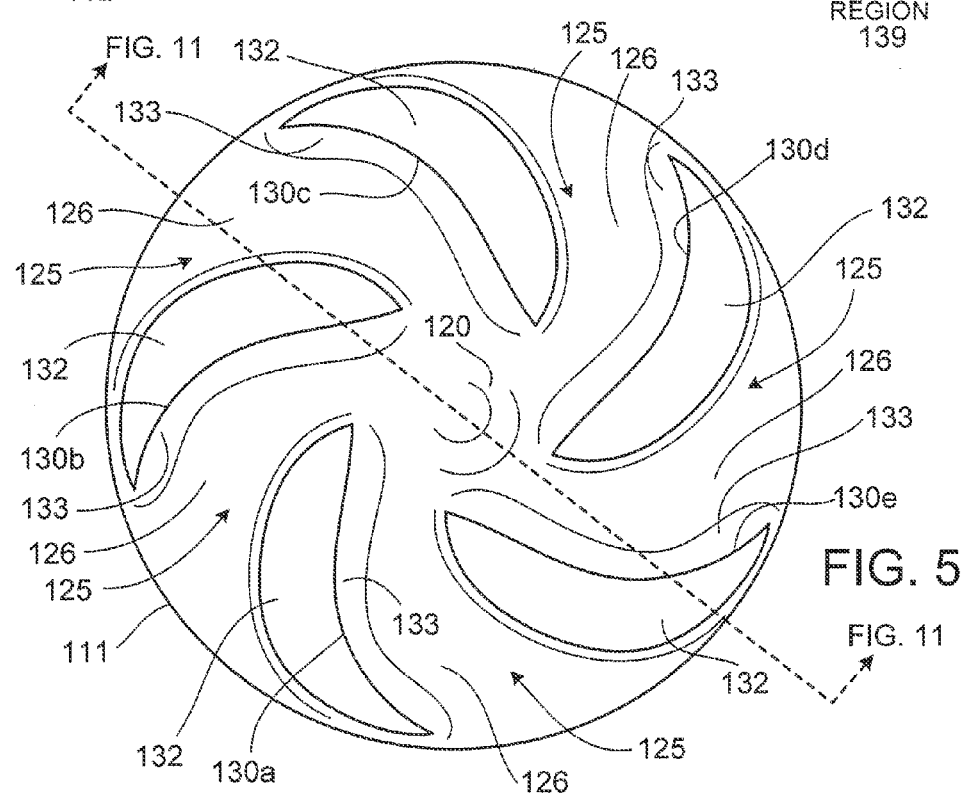

TURBINE SYSTEM AND METHOD

CROSS-REFERENCE TO RELATED APPLICATIONS

This is a continuation application of U.S. application Ser. No. 13/936,269, filed on Jul. 8, 2013 by Theodore J. Christopher, which is a continuation application of U.S. application Ser. No. 12/944,990, filed on Nov. 12, 2010 by Theodore J. Christopher. The contents of these prior applications are fully incorporated herein by reference.

TECHNICAL FIELD

This document relates to a turbine, for example, that rotates to generate electrical power from fluid flow.

BACKGROUND

Some turbine systems generate electrical power in response to rotation of a turbine. For example, numerous wind turbine systems attempt to harvest the wind energy from air flow over a set of wind turbine blades, which drive the wind turbine blades to rotate about axis and thereby drive an internal generator to output electrical energy. In another example, conventional hydro turbine systems seek to convert energy from water currents in rivers or tidal currents in oceans or seas into electrical energy.

SUMMARY

Some embodiments of a turbine system described herein provide a turbine that rotates in response to off-axis fluid flow, such as water flowing in a generally horizontal direction that is generally perpendicular to a vertical axis of rotation. The turbine system can employ a synergistic combination of fluid dynamics principals to harvest the kinetic energy in flowing water or other fluid for conversion into mechanically rotary motion. For example, the turbine system can provide a vertical-axis turbine formed as a unitary structure that, in response to the off-axis fluid flow, rotates in one direction regardless of the direction of the fluid flow (which can be useful when harvesting energy from tidal currents in an ocean environment). In particular embodiments, the vertical-axis turbine is configured to provide enhanced efficiency even in slow-moving fluid flow (such as a slow stream or river).

In some embodiments, a turbine system may include a turbine that rotates about a central axis in response to fluid flowing toward the turbine in a flow direction that is generally perpendicular to the central axis. The shape of the turbine can contribute to a synergistic combination of fluid dynamics principals to drive the rotary motion of the turbine.

Particular embodiments described herein include a turbine for use in an electrical generation system. The turbine may comprise a vertical-axis turbine that rotates about a vertical axis in response to fluid flowing toward the turbine in a flow direction which is generally perpendicular to the vertical axis. The vertical-axis turbine may include a central upper dome surface at least partially defined by a bell-shaped curve in a vertical cross-sectional plane. Also, the vertical-axis turbine may include a plurality of upwardly protruding fins that each extend from an outer region proximate to an outer periphery of the vertical axis turbine toward the central upper dome surface. Each of the fins may terminate at a vertical height below an uppermost region of the central upper dome surface.

In some embodiments, a turbine system for generating electrical power may include a vertical-axis turbine. The vertical-axis turbine may include a plurality of fins formed as a unitary structure with a centrally located, convexly curved upward facing surface. The vertical-axis turbine may rotate about a vertical axis in a first direction about a vertical axis both in response to fluid flowing over the turbine in a first flow direction that is generally perpendicular to the vertical axis and in response to fluid flowing over the turbine in a second opposite flow direction that is generally perpendicular to the vertical axis.

In certain embodiments, a turbine system for generating electrical power may include a vertical-axis turbine that is configured to rotate about a vertical axis in response to fluid flowing toward the turbine in a flow direction which is generally perpendicular to the vertical axis. The vertical-axis turbine may include an uppermost surface region defined by an upwardly facing convex curvature centered about the vertical axis. The system may also comprise a base structure positioned below the vertical-axis turbine to remain generally stationary during rotation of the vertical-axis turbine. The system may further comprise an electrical generator positioned between the vertical-axis turbine and the base structure so as to generate electrical power in response to the rotation of the vertical-axis turbine relative to the base structure.

Particular embodiments described herein may include a method of using a turbine system for generating electrical power from underwater current flow. The method may include positioning a vertical-axis turbine underwater such that a vertical axis of rotation of the vertical-axis turbine is arranged generally perpendicularly to water flow. The vertical-axis turbine may include a continuously solid upward facing surface that includes a central upper dome surface and a plurality of upwardly protruding fins that each extend from an outer region proximate to an outer periphery of the vertical axis turbine toward the central upper dome surface. The method may also include generating electrical power in response to rotation of the vertical-axis turbine caused by water flowing over the central upper dome surface and interacting with the plurality of upwardly protruding fins.

Some embodiments described herein include a method of manufacturing a turbine system for use in generating electrical power. The method may include molding a vertical-axis turbine. For example, the vertical-axis turbine may be molded such that a plurality of fins of the turbine are formed as a unitary structure with a centrally located, convexly curved uppermost surface of the turbine. The method may also include mounting the vertical-axis turbine to base structure such that the vertical-axis turbine is configured to rotate about a vertical axis relative to the base structure in response to fluid flowing toward the turbine in a flow direction that is generally perpendicular to the vertical axis.

These and other embodiments described herein may provide one or more of the following benefits. First, some embodiments of the turbine system can include a turbine that employs synergistic combination of fluid dynamics principals to harness the kinetic energy in flowing water or other fluid for conversion into mechanically rotary motion. This mechanical rotary motion can be used, for example, to drive a rotor shaft of a permanent magnet generator for purposes of generating electrical power, or alternatively, to drive a pump system that urges hydraulic fluid through a remotely located (e.g., onshore) electric generator machine.

Second, the turbine system can employ a turbine having a novel shape that advantageously harnesses the kinetic energy of the flowing water or other fluid from both the Newtonian forces acting upon the fins and also from a pressure recovery effect as the water or other fluid flows over an upper dome surface and down along the downstream side of turbine. For example, the turbine can include an upper convex surface centrally located about the vertical axis which is at least partially defined by a bell-shaped contour in a vertical cross-section plane. This bell-shaped contour contributes to the pressure recovery effect as fluid flows over the upper convex surface in a direction that is transverse to the vertical axis. This bell-shaped contour enables the upper convex surface to controls and maintains laminar flow over the body of the turbine. Also, the turbine includes a set of upwardly projecting fins that are configured to harness and redirect the water or other fluid flowing over the upstream portion of the turbine (thereby contributing Newtonian forces to the rotational motion) as well as harnessing the water or other fluid flowing to the downstream portion (e.g., flowing over the upper convex surface of the turbine and down the bell-shaped contour). In addition, the fins are configured to control the flowing fluid path over the main body of the turbine and direct the fluid towards different areas at different times based on their orientation to the flow of the current. Further, in some circumstances, the fins may be configured to manage the turbulent flow off the main body of the turbine by way of vortex generation, which can instruct the non-laminar flow around the turbine to organize around these vortexes and thereby reduce the effects of drag or other inefficiencies during operation of the turbine.

Third, the turbine system can be configured to generate significant levels of electrical power even in slow-moving fluid flow (such as a slow stream or river). Moreover, the turbine can be configured with a relatively low vertical profile compared to an outer diameter of the turbine, which enables the turbine to rotate about the vertical axis with significant power even when the water depth is relatively shallow (e.g., less than the diameter of the turbine). In some circumstances, the turbine can be configured to having a main body that is about 7.9 feet in diameter (centered about the vertical axis of rotation) and can be used to generate mechanical rotary motion that is sufficient to produce, for example, electrical power even when submerged in generally horizontal water current of a slow river or stream. In other embodiments, the turbine can be configured to having a main body that is about 12 feet in diameter (centered about the vertical axis of rotation) and can be used to generate mechanical rotary motion that is sufficient to produce, for example, electrical power when submerged in ocean tidal currents that flow generally perpendicularly to the vertical axis. In some portable embodiments, the turbine can be configured to having a main body that is about 4 to about 8 inches diameter (centered about the vertical axis of rotation) and can transported in a backpack or with military equipment to provide a portable power generator for use in a river or stream. Accordingly, the turbine may rotate at a speed that is generally safe for fish or other marine life while the turbine system harvests a safe and renewable energy source.

Fourth, the turbine system can be constructed in a manner that causes the turbine to rotate in a consistent rotational direction about the vertical axis both when exposed to fluid flow approaching from a first flow direction that is generally perpendicular to the vertical axis and when exposed to a second flow direction that is opposite to the first flow direction. In such embodiments, the turbine system can be advantageously submerged along the floor of an ocean or sea that is subject to tidal currents. For example, some embodiments of the turbine system can be configured to produce mechanical rotary motion in one direction about the vertical axis (for purposes of generating electrical power) both when exposed to the tidal currents during hide tide and when exposed to the tidal currents during low tide. In such circumstances, the turbine system is not required to employ multiple turbine blade structures that rotate in opposite directions (e.g., one blade structure for high tide currents and another blade structure for low tide currents).

Fifth, as described in more detail below, the turbine can be constructed as a unitary structure such that all of the fins and the upper convex surface are formed as a low maintenance, single-piece structure, which is particularly beneficial for ocean and river applications in which the turbine system is fully submerged. In certain embodiments, the turbine can be formed as a unitary structure as part of a molding process that collective forms the main body of the turbine including the upper convex surface and the fins. Such a molding process may be useful in forming a turbine in which the entire upper face (including the upper convex surface, the plurality of upwardly protruding fins, and the channel base surfaces between neighboring fins is free of apertures or other openings. In some preferred embodiments, the turbine has a continuously solid upward facing surface that extends to a circular border at the outer periphery of the turbine. Optionally, a drive shaft can be integrally molded with the main body of the turbine such that the drive shaft extends downwardly from a lower face of the molded turbine body. Accordingly, the turbine can be efficiently and reproducibly manufactured in a low cost manner that may significantly reduce the number of components and the corresponding assembly time.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a perspective view of a turbine for use with a turbine system such as the system of FIG. 1, in accordance with some embodiments.

FIG. 5 is a top plan view of the turbine of FIG. 4;

Like reference symbols in the various drawings indicate like elements.

DETAILED DESCRIPTION OF ILLUSTRATIVE EMBODIMENTS

Figure 1:
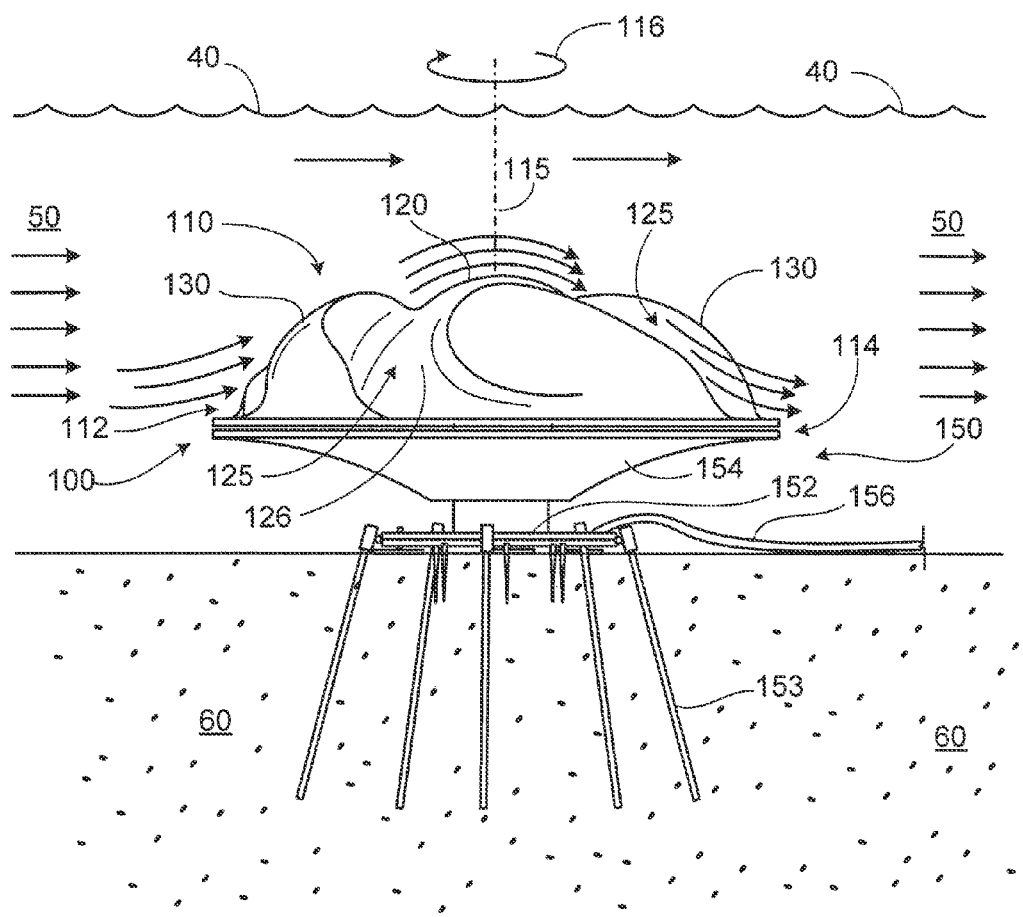
FIG. 1 is a side view of a turbine system submerged in a flowing fluid, in accordance with some embodiments.
Figure 2:
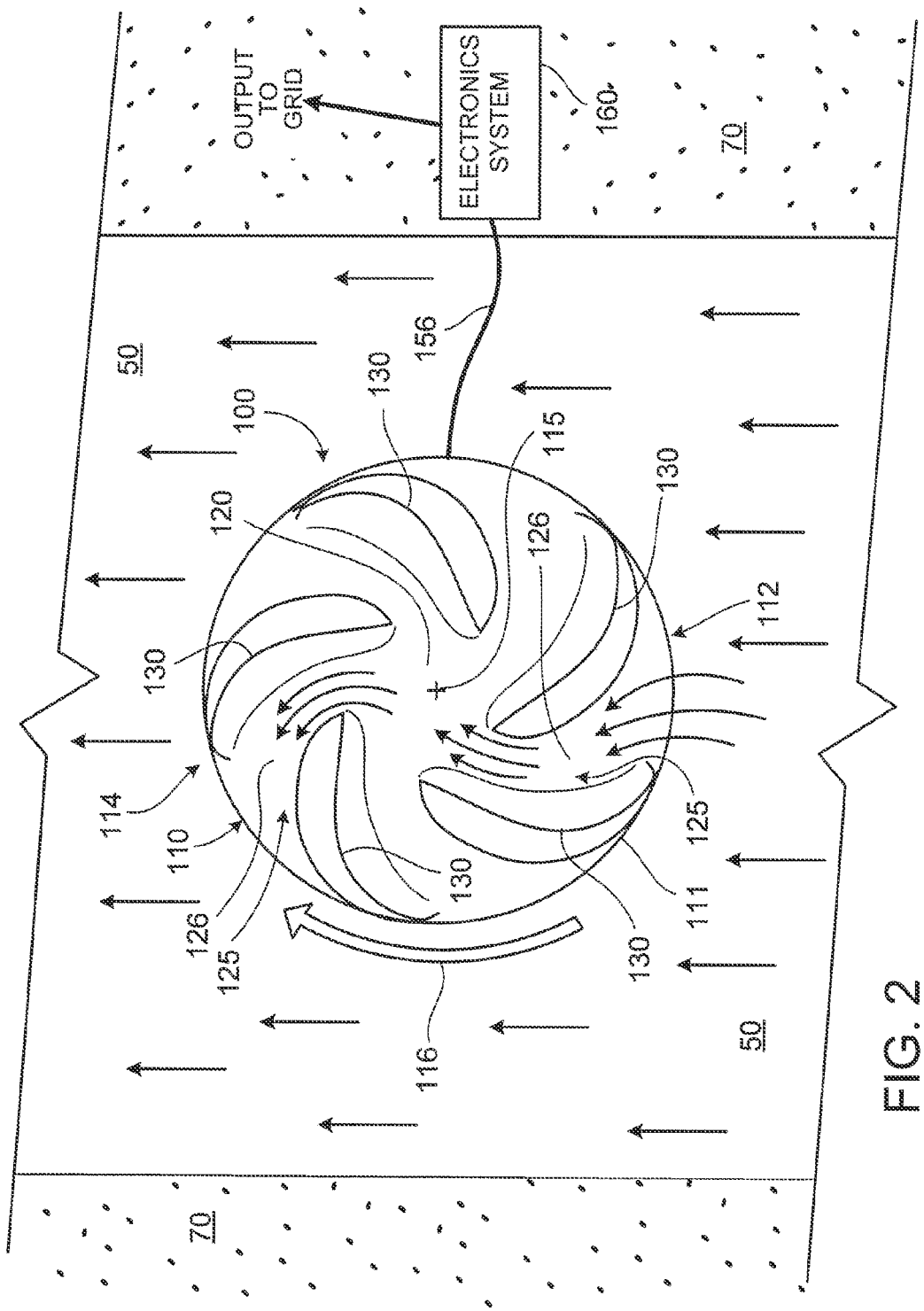
FIG. 2 is a top view of the turbine system of FIG. 1.

Referring to FIGS. 1-2, some embodiments of a turbine system 100 can include a turbine 110 that is configured to rotate about a vertical axis 115 in response to off-axis fluid flow, such as fluid flow 50 approaching the turbine 110 from a direction that is generally perpendicular to the vertical axis 115. For example, in some embodiments, the turbine system 100 can be equipped with the vertical-axis turbine 110 that generates mechanical rotary motion 116 to produce electrical power in response to water flowing in a river, stream, ocean, sea, or other body of water having currents. In the depicted embodiment, the turbine 110 is formed as a unitary structure that, in response to the off-axis fluid flow 50, can be configured to provide enhanced efficiency for electrical power generation even in slow-moving fluid flow (such as a slow stream, river, or tidal current).

The turbine system can also include a base structure 150 positioned below the vertical-axis turbine 110, which is secured to the floor 60 below the surface 40 of the body of water in which the turbine 110 is fully submerged. As such, the base structure 150 is configured to remain generally stationary during rotation of the vertical-axis turbine 110. In this embodiment, the base structure includes a pedestal structure 152 having a plurality of anchors 153 that are driven into the floor 60 of the body of water so as to anchor the position of the turbine system 100. The base structure 154 may also include a lower housing shell 154 that is positioned oppositely from the turbine 110 such that an interior space is at least partially defined between the turbine 110 and the base structure 150. As described in more detail below, some embodiments of the turbine system 100 may include permanent magnet generator (or, alternatively, a hydraulic pump system) housed in the interior space between the turbine 100 and the base structure 150. In such circumstances, the components of the turbine system 100 can be constructed in a manner that conserves space and provides a relatively low profile to operate in a shallow depth of a body of water.

At least one line 156 (e.g., an electrical cable line or a pipe line) may extend from the base structure 150 toward a non-submerged electronics system 160 (FIG. 2). The line 156 may output electrical current generated from a permanent magnet generator (described in more detail below) coupled to the base structure 150 to the non-submerged electronics system 160. In this embodiment, the electronics system is position at an onshore location, but it should be understood that in alternative embodiments, the electronics system may be located on an above-surface platform constructed over the surface 40 of the water. The electronics system 160 can include an inverter and transmission system that is configured to condition the electrical power from the line 156 for output to an external grid system. For example, the electronics system 160 can be configured to output the electrical power as three-phase 120V AC power that is transmitted to the external power grid. In some alternative embodiments, the electronics system 160 may house the electric generator (such that there is no generator coupled to the base structure 150 under the surface 40) so as to provide simplified maintenance. In those circumstances, the line 156 can be configured to provide pressurized fluid path (e.g., hydraulic fluid) that is pumped to the electronics system 160 by the power of the mechanical rotary motion 116 of the turbine 110. From there, the hydraulic fluid can drive a rotor of the electric generator (housed by the electronics system 16) to rotate and thereby generate electric power. In any of these scenarios, the turbine 110 can be used to generate the mechanically rotary motion 116 that is sufficient to produce electrical power even when submerged in relatively slow moving water current.

Still referring to FIGS. 1-2, the vertical-axis turbine 110 may include a centrally located upper convex surface 120 and a plurality of upwardly protruding fins 130. In this embodiment, the upper convex surface 120 is at least partially defined by a bell-shaped curve in a vertical cross-sectional plane (refer also to FIG. 11) such that the upper convex surface has a generally dome shape at its apex. Each of the fins 130 extends from an outer region 111 of the turbine (e.g., at or near the outer diameter of the turbine body as shown in FIG. 2) and towards centrally located upper convex surface 120. As described in more detail below, in this embodiment each of the fins 130 terminate at a vertical height below an uppermost region of the upper convex surface 120. Accordingly, the upper convex surface 120 in this embodiment rises above the terminal ends of each fin 130.

As shown in FIGS. 1-2, the plurality of fins 130 are arranged such that the vertical-axis turbine 110 is urged to rotate in the rotational direction 116 about the vertical axis 115 in response to the fluid flow 50 traveling in a first flow direction that is generally perpendicular to the vertical axis 115 (e.g., flowing from left to right as shown in FIG. 1 and from bottom to top as shown in FIG. 2). However, it should be understood from the description herein that the arrangement of the fins 130 likewise causes the vertical-axis turbine 110 to rotate in the same rotational direction 116 in response to the fluid flow 50 traveling in a second opposite flow direction that is also generally perpendicular to the vertical axis 115. In other words, the turbine 110 would be urged to rotate in the same rotational direction 116 even if the fluid flow 50 was traveling opposite to that depicted in FIGS. 1-2 (e.g., if it was flowing from right to left in FIG. 1 and from top to bottom in FIG. 2). Thus, the fins 130 of the turbine are arranged such that vertical-axis turbine 110 that rotates in the rotational direction 116 about the vertical axis 115 both in response to fluid flowing over the turbine in a first flow direction that is generally perpendicular to the vertical axis and in response to fluid flowing over the turbine in a second opposite flow direction that is generally perpendicular to the vertical axis.

Still referring to FIGS. 1-2, the shape of the upper convex surface 120 and the upwardly extending fins 130 contribute to a synergistic combination of Newtonian forces and a pressure recovery effect to drive the rotary motion 116 of the turbine 110, which can advantageously provide significant rotational power even in relatively slow fluid flow. For example, when the turbine 110 is submersed into the fluid 50 (e.g., water flow in this embodiments), the fluid 50 is directed to flow into one or more channels 125 between neighboring fins 130 at an upstream portion 112 of the turbine 110 and over the top of the upper convex surface 120. Each of the channels includes a base surface 126 that leads to the upper convex surface 120. As described in more detail below, each base surface 126 of the channels 125 may be at least partially defined by the bell-shaped contour in the vertical cross-section of the turbine 110. Thus, while the fluid 50 flowing through the channels 125 is redirected by the fins 130 (thereby providing Newtonian forces that urge the rotation of the turbine 110), the fluid is also traversing upward along the bell-shaped contour of the base surfaces 126 of the channels 125 toward upper convex surface 120 (thereby staging for a pressure recovery effect along the downstream portion 114). From there, the fluid 50 is directed down the upper convex surface 120 and into one or more of the channels 125 at a downstream portion 114 of the turbine 110. As the fluid 50 moves in this path from the upper convex surface 120 to the downstream portion 114, a pressure recovery effect is induced to develop a high pressure region (refer also to FIG. 4) along the downstream portion 114 that contributes significant power to act upon the respective fin 130 and rotate the turbine 110.

Figure 3:
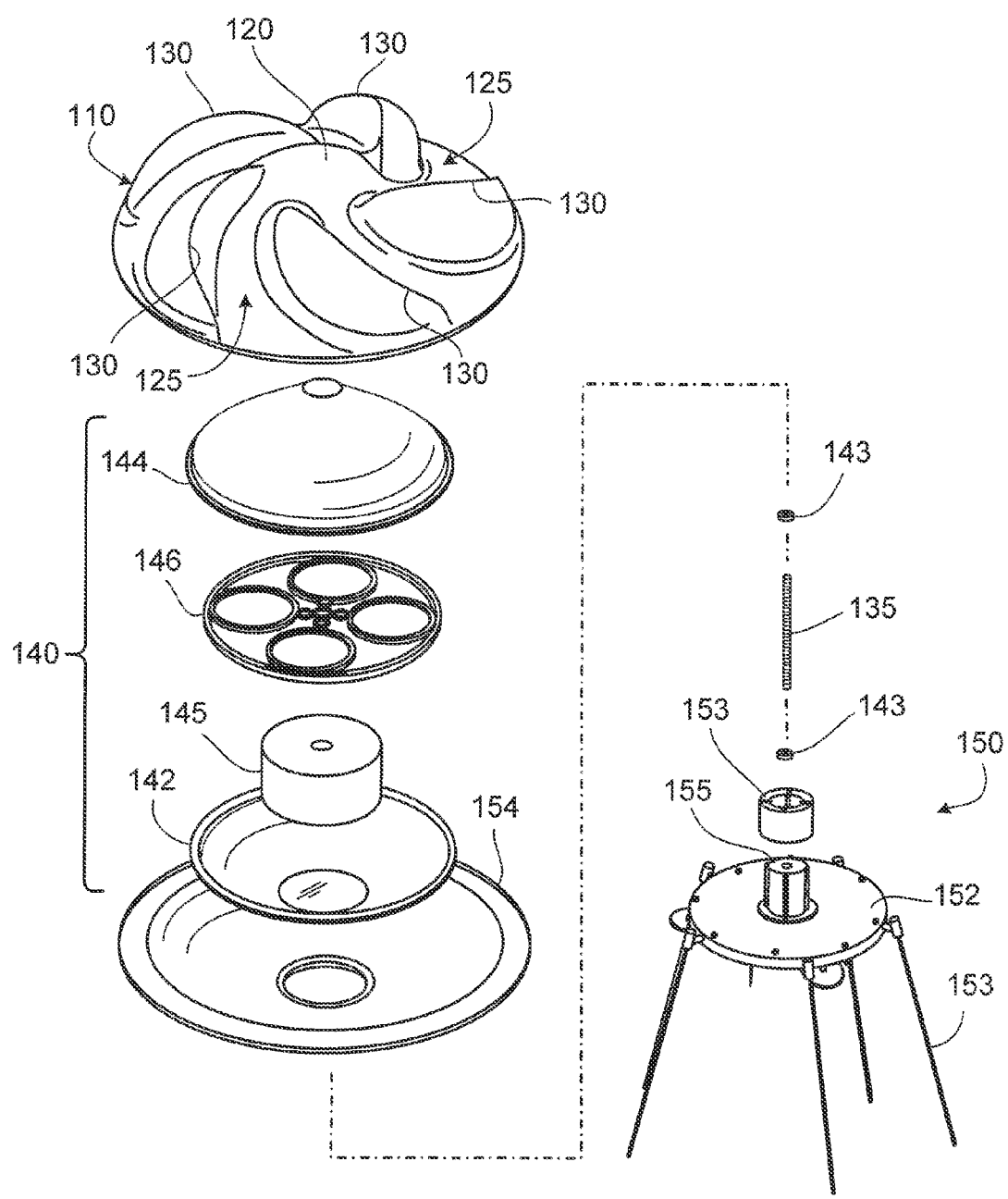
FIG. 3 is a perspective exploded view of particular components of the turbine system of FIG. 1.

Referring now to FIG. 3, some embodiments of the turbine system 100 can be constructed so that one or more components are positioned in a sealed housing 140 between the turbine 110 and the base structure 150. The sealing housing 140 may be used to house components that facilitate the conversion of the mechanical rotary motion 116 (FIGS. 1-2) of the turbine 110 into electrical power. In this embodiment, the turbine 110 is mounted at the uppermost part of the turbine system 100 so that the fluid 50 is merited to flow over the upper convex surface 120 of the turbine 110 (refer to FIGS. 1-2) while the base structure 150 is anchored to the ground 60 under the surface 40. The turbine 110 can be formed as a single-piece component such that all of the fins 130, the channel base surfaces 126, and the upper convex surface 120 are molded as a single unitary structure. In some embodiments, the drive shaft 135 may be integrally molded with the turbine 110 so that the drive shaft 135 fixedly extends from a lower face of the turbine 110.

In some embodiments, the base structure 150 may include a number of components that are assembled together. For example, the pedestal structure 152 can include the plurality of anchors 153 that extend downwardly therefrom so that the anchors can reside in the ground while the pedestal structure 152 is positioned on the floor 60 of the body of water. The base structure 150 may also include a bearing member 155 that receives an end of the drive shaft 135 (opposite from the end that is mounted to the turbine 110). A collar seal 153 of the base structure 150 can fit over the bearing member 155 so as to provide a seal with the lower housing shell 154. It should be understood from the description herein that, in alternative embodiments, the turbine 110 can be rotatably mounted to a base structure having a different size, shape, or anchoring technique.

Still referring to FIG. 3, the sealed housing 140 can be mounted between the lower housing shell 154 of the base structure 150 and the turbine 110 so as to utilize the interior space between the turbine 110 and the base structure 150. In some cases, this configuration of the turbine system 100 can be used to achieve a relatively low profile or vertical height of the turbine system 100 so that it can operate in a shallow depth of a body of water. The seal housing 140 can include first and second shells 142 and 144 that are sealed together to enclose a number of components, such as a permanent magnet generator 145 and a gear system 146. The gear system 146 may comprise a planetary gear system or another gear arrangement that converts the rotational motion 116 of the turbine 110 (and the drive shaft 135 mounted thereto) into a higher rotational speed for the rotor of the permanent magnet generator 145. The permanent magnet generator 145 may include a rotator that rotates inside a stator (e.g., having conductive coils arranged in slots) so that the rotation of the rotor induces electrical current in the coils of the stator. This generated current can be output via the line 156 (FIG. 2) to the electronic system 160 onshore or on a platform. It should be understood that alternative embodiments of the permanent magnet generator (having different internal components or a different size and shape) can be employed in the turbine system 100. The drive shaft 135 extends downwardly from the lower face of the turbine 110, through the sealed housing 140, and to the bearing member 155 of the base structure 150. The sealed housing 140 can be equipped with bearing seals 143 at the apertures of the first and second shells 142 and 144 so as to provide a watertight seal along the portion of the drive shaft 135 that passes through the sealed housing 140.

In some alternative embodiments, the structure 145 inside the sealed housing 140 may be a pump system rather than a permanent magnet generator. For example, in some embodiments, the non-submerged electronics system 160 (FIGS. 1-2) may house the electric generator (such that there is no generator coupled to the base structure 150) so as to provide convenient access to the generator for maintenance or repair purposes. In those circumstances, the structure 145 inside the sealed housing 140 can include a pump system that forces hydraulic fluid through a pipeline (e.g., such as line 156 in FIG. 2) to the electronics system 160 by the power of the mechanical rotary motion 116 of the turbine 110. From there, the hydraulic fluid can drive a rotor of the electric generator (housed by the electronics system 160) to rotate and thereby generate electric power.

Referring now to FIGS. 4-11, the shape of the structures on the upper face of the turbine 110 contribute to a synergistic combination of Newtonian forces and a pressure recovery effect to drive the rotary motion 116 of the turbine 110. The upper face of the turbine 110 can include the centrally located upper convex surface 120, the plurality of upwardly protruding fins 130, and the channels 125 (with channel base surfaces 126) defined between neighboring fins 130. In this embodiment, the turbine comprises five fins 130a-e that protrude upwardly to a vertical height greater than the outer periphery 111 of the turbine 110. As described in more detail below, when the fins 130a-e rotate to different positions about the vertical axis 115, each fin 130a-e is configured to capture fluid flowing over the upper face of the turbine 110, redirecting the fluid along a path different from the ambient fluid flow, and inducing a high pressure region 138 on the downstream portion 114 of the turbine 110. In particular, the high pressure region 138 is generally formed in a channel on a first side of a respective fin at a downstream position (find 130d in the position depicted in FIG. 4), and a low pressure region 139 is formed on a second opposite side of the respective fin.

The turbine 110 in this embodiment has an upper face defined by the centrally located upper convex surface 120, the plurality of upwardly protruding fins 130, and the channel base surfaces 126 (between the neighboring fins 130). Accordingly, in this embodiment, the entire upper face of the turbine 110 is free of apertures or other openings such that turbine 110 has a continuously solid upward facing surface that extends to a circular border at the outer periphery 111 of the turbine 110. In some embodiments, the outer periphery 111 of the turbine 110 may have a diameter of about 5 feet or greater, about 7 feet to about 20 feet, and preferably about 7.9 feet for river or stream applications and preferably about 12 feet for some ocean applications. In some portable embodiments, the outer periphery 111 of the turbine 110 may have a diameter of about 4 inches to about 12 inches, preferably about 6 inches for simplified transport in a backpack or with military soldier equipment to provide a portable power generator for temporary use in a river or stream (e.g., to provide electrical power for communication equipment or other gear).

Still referring to FIGS. 4-11, in this embodiment, all of the fins 130a-e are positioned radially inward of the circular border at the outer periphery 111 of the turbine 110, and all of the fins also protrude upwardly to a vertical height above the outer periphery 111 of the turbine 110. Each of the fins 130a-e may have a substantially identical shape and size, and may include a convex face 132 and an oppositely disposed concave face 133. The convex face 132 of each fin 130a-e intersects with the oppositely disposed concave face 133 along a curved ridge that extends toward the centrally located upper convex surface 120. In operation, the convex surface 132 may have a hydrofoil shape that reduces drag as water flows over the convex surface 132, while the concave surface 133 is configured to capture and redirect the fluid flow 50. Accordingly, the fins 130a-e are arranged such that vertical-axis turbine 110 that rotates in the rotational direction 116 (FIGS. 1-2) about the vertical axis 115 both in response to fluid flowing over the turbine 110 in a first flow direction that is generally perpendicular to the vertical axis 115 and in response to fluid flowing over the turbine in a second opposite flow direction that is also generally perpendicular to the vertical axis 115.

As shown in FIGS. 4-5, the plurality of fins 130a-e are positioned to be non-symmetric about the vertical axis. For example, in this embodiment each of the fins 130a-e is curved along the length extending from the outer fin region that is proximate to the outer periphery 111 of the turbine 110 toward the central upper convex surface 120, and concave face 133 of each fin 130a-e terminates in a non-radial direction that extends toward an adjacent fin and away from the vertical axis 115. In one illustrative example, the concave face 133 of the fin 130a extends away from the outer periphery 111 and toward the central upper convex surface 120, but the concave face 133 terminates in a direction that points toward the adjacent fin 130b (not in a radial direction toward the central vertical axis 115). It should be understood that, in alternative embodiments, the turbine 110 may comprise fins 130 that are symmetrically positioned about the vertical axis 115, for example, the turbine may comprise four fins 130 that are positioned symmetrically about the vertical axis 115.

The shape of the fins 130a-e can be configured to harness the fluid flow 50 that approaches each respective fin 130a-e on the upstream portion 112 of the turbine 110. Moreover, the shape of the fins 130a-e is also configured to harness the fluid flow a second time as the fluid flow 50 travels over the upper convex surface 120 and down the bell-shaped contour on the downstream portion 114 of the turbine 110. In some flow conditions, the shape of the fins 130a-e may contribute to vortex generation above the turbine 110 that adds yet another benefit for harnessing the kinetic energy of the fluid flow 50. In some circumstances, the fins 130a-e can manage turbulent flow off the turbine body by way of vortex generation (refer to each vortex 116 in FIG. 4), which urges or instructs the non-laminar flow around the rotating turbine 110 to organize around these vortexes and thereby reduces the drag upon the turbine 110. As shown in FIG. 4, in this embodiment the fins 130a-e are configured to generate at least one vortex 116 that is transverse to the vertical axis 116 of the turbine 110 in response fluid flow 50 that is generally perpendicular to the vertical axis 115.

Figure 6:
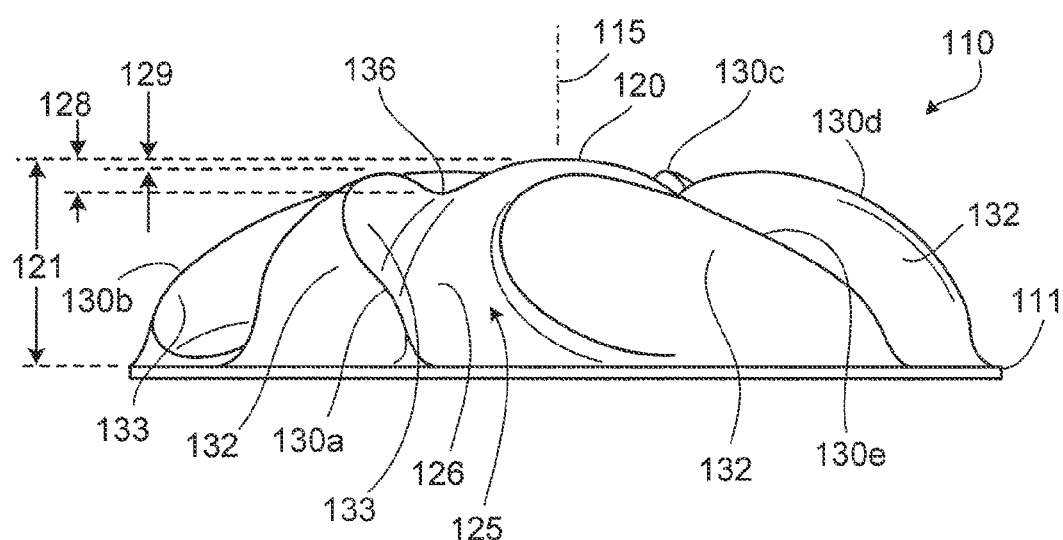
FIG. 6 is a front elevation view of the turbine of FIG. 4.
Figure 7:
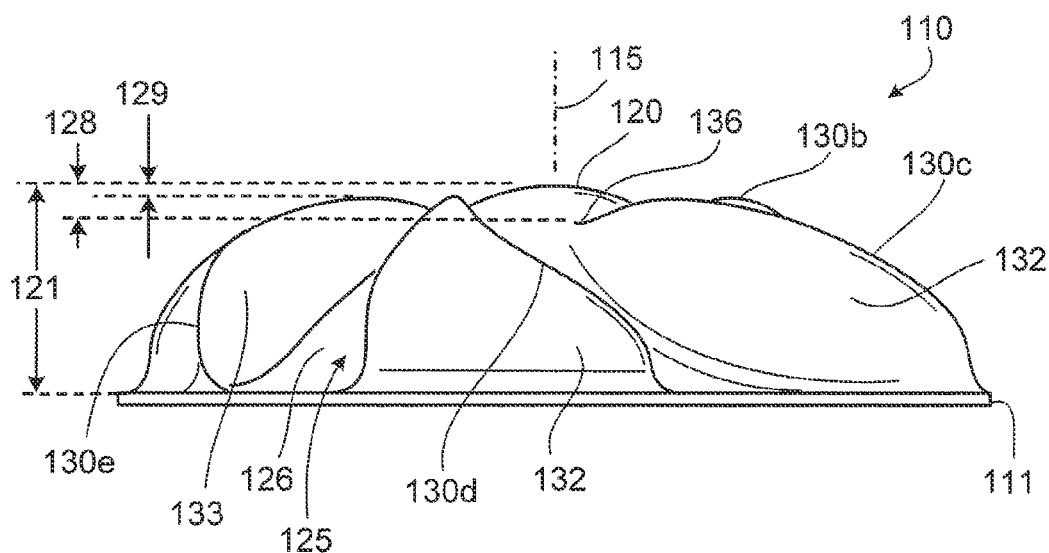
FIG. 7 is a right elevation view of the turbine of FIG. 4.
Figure 8:
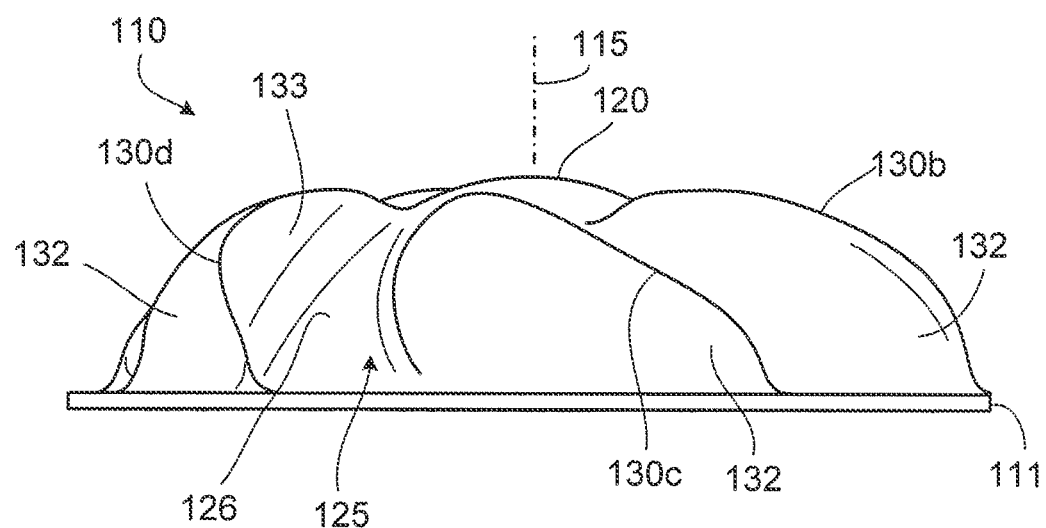
FIG. 8 is a rear elevation view of the turbine of FIG. 4.
Figure 9:
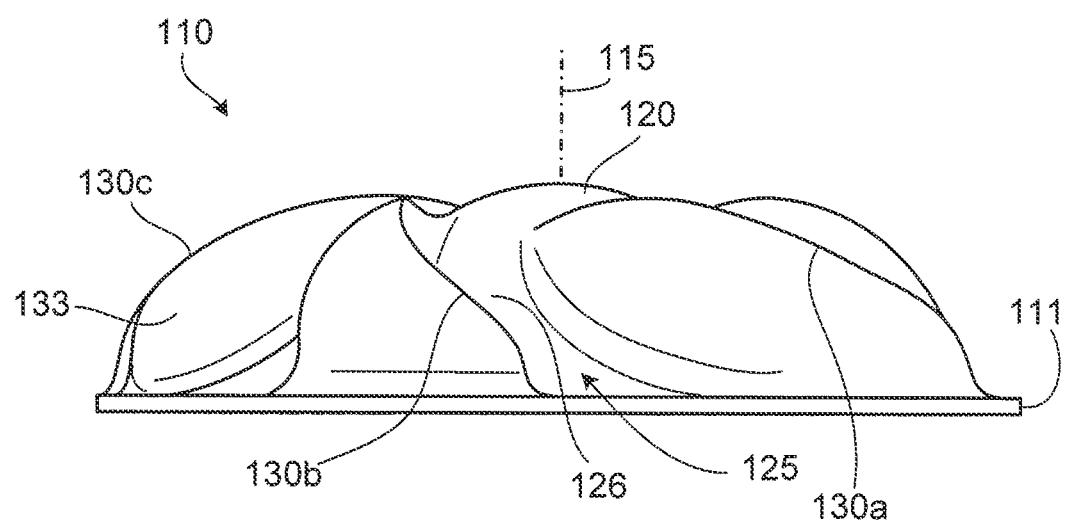
FIG. 9 is a left elevation view of the turbine of FIG. 4.
Figure 10:
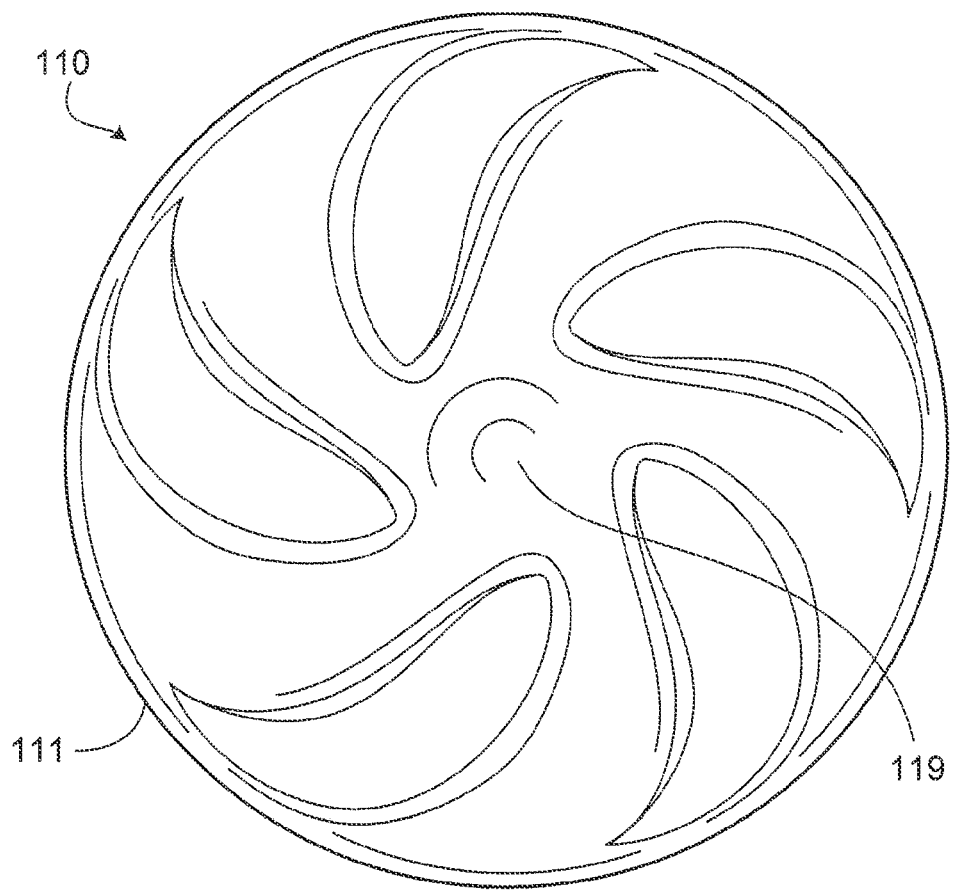
FIG. 10 is a bottom plan view of the turbine of FIG. 4.

Still referring to FIGS. 4-11, in this embodiment of the turbine 110, the centrally located upper convex surface 120 is symmetric about the vertical axis 115. The upper convex surface 120 may be defined by the bell-shaped contour in a vertical cross-section (refer to FIG. 11) so that the surface 120 serves as a dome 120 that guides the fluid flow 50. In some embodiments, as shown in FIGS. 6-7, each of the fins 130a-e terminate (refer to termination point 136) at a vertical height 128 that is below an uppermost region (including the apex) of the central upper convex surface 120. This structural relationship between the fins 130a-e and the upper convex surface 120 may cause the turbine 110 may operate more efficiently (reducing effects of drag) because the fluid flow 50 passing through the channel 125 toward the upper convex surface 120 is able to pass over the uppermost region of the convex surface 120 without interference from the fins 130a-e. Also in some embodiments, the upper most region (including the apex) of the central upper convex surface 120 has a vertical height 121 that is greater than all of the fins 130a-e. For example, the maximum vertical height of each of the fins 130a-e may be less than the vertical height 121 of the upper convex surface (refer to dimension 129 shown in FIGS. 6-7). Here again, this structural relationship between the fins 130a-e and the upper convex surface 120 may provide improved efficiency for the turbine 110 in some circumstances.

Thus, in some embodiments, the upper convex surface 120 of the turbine 110 represents that structure along the upper face having the greatest vertical height. This configuration may provide for simplified breaking of the turbine during removal for maintenance or repair purposes. For example, in some circumstances, the turbine 110 may automatically cease rotating when the upper convex surface 120 is elevated above the surface 40 of the water (even as the fins 130a-e are exposed to the fluid flow 50 below the surface 40). Accordingly, the structures along the upper face of the turbine 110 can provide improved efficiency for the turbine 110 when the turbine is submerged while also providing improved safety when turbine 110 is not fully submerged (e.g., when the upper convex surface 120 is above the fluid surface 40).

Figure 11:
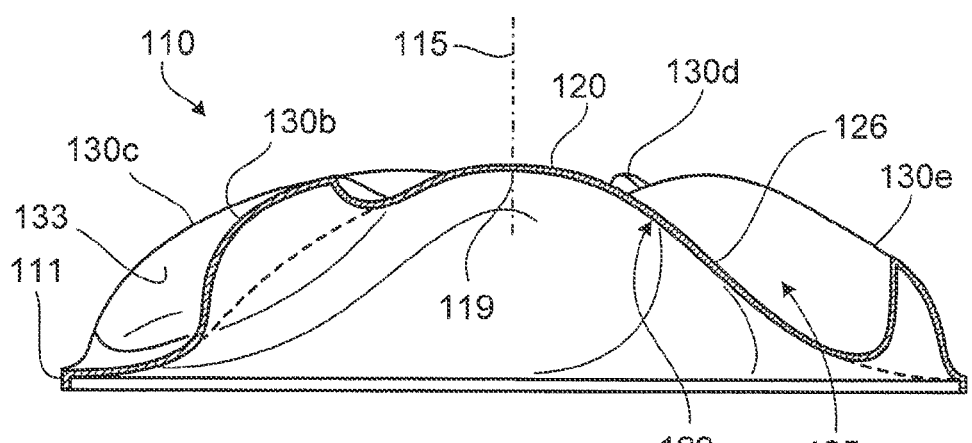
FIG. 11 is a vertical cross-sectional view of the turbine of FIG. 4.

As shown in FIG. 11, the upper convex surface 120 and the channel base surfaces 126 (between the fins 130a-e) are defined by the bell-shaped contour 122 in a vertical cross-sectional plane. It should be understood that, in this embodiment, the bell-shaped contour 122 is present in any vertical cross-sectional plane along the vertical axis 115. Accordingly, in this embodiment the upper convex surface 120 provides a dome at the uppermost region of the turbine 110 that smoothly transitions into the channel base surfaces 126 between the fins 130a-e. Thus, in particular embodiments, the bell-shape contour 122 depicted in FIG. 11 may serve as a "base shape" that is interrupted by the fins that protrude upwardly from the base shape. As described in more detail below, the curved contour 122 of the turbine 110 in the vertical cross-section facilitates the pressure recovery effect that enables the turbine 110 to capture the kinetic energy from directional changes to the fluid flow more than once.

Figure 12:
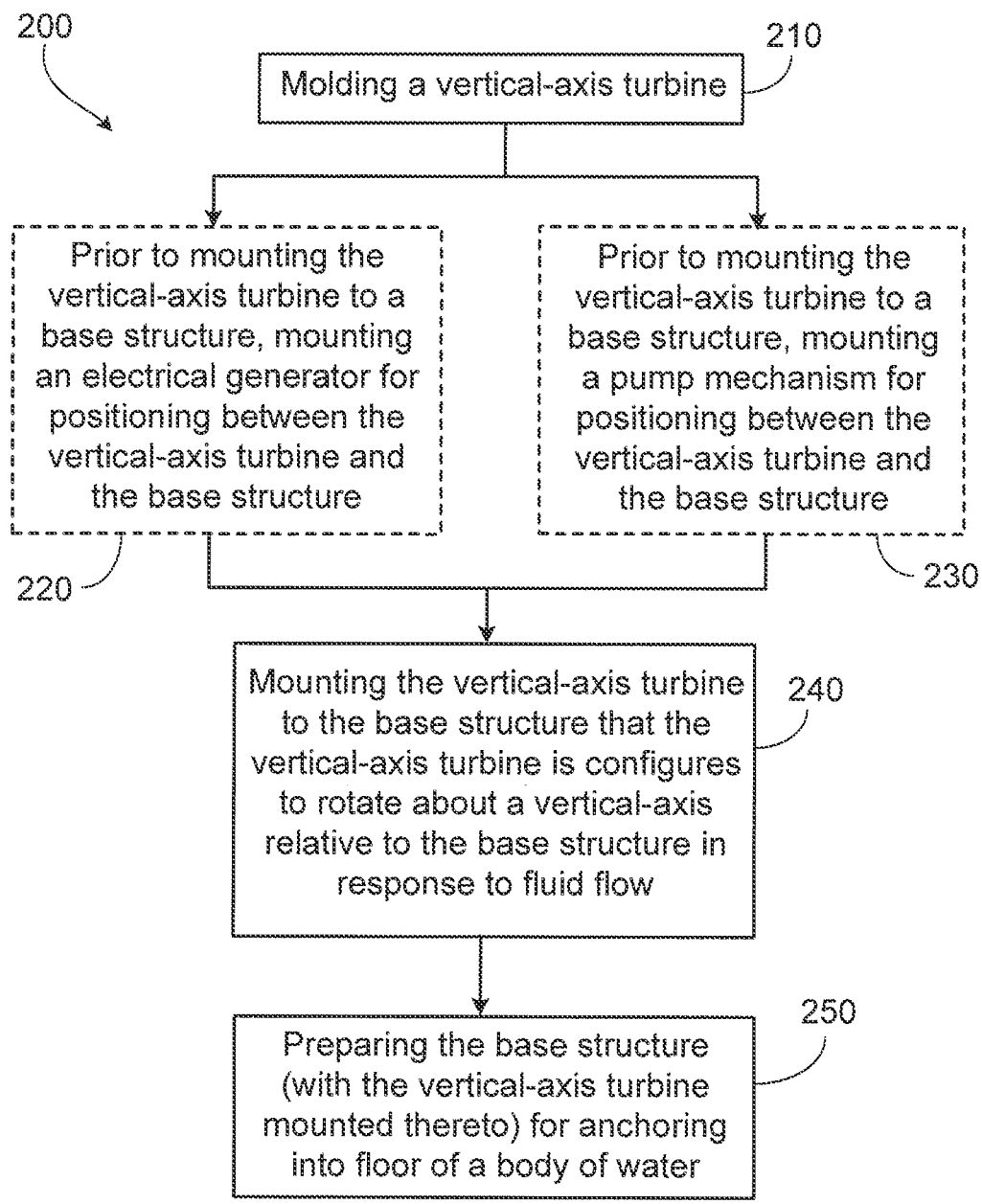
FIG. 12 is a flow chart for a process of manufacturing a turbine system such as the system of FIG. 1, in accordance with some embodiments

Referring now to FIG. 12, some embodiments of a method 200 to manufacture a turbine system (such as the turbine system 100) can include a molding operation to form the turbine. For example, the method 200 may include the operation 210 of molding a vertical-axis turbine such as the turbine 110 illustrated in FIGS. 4-11. In such circumstances, all components of the turbine 110 (including the upper convex surface 120, the fins 130a-e, and the base surfaces 126 between the fins) may be molded as unitary structure. For example, a female master mold can receive a moldable polymer or composite material (such as a synthetic polymer (Nylon, Mylar), a fiber reinforced polymer (fiberglass, Kevlar) or carbon fiber reinforced plastic (carbon fiber)) to thereby formed the depicted upper face of the turbine 110 in an efficient manner. In some embodiments, the drive shaft 135 (FIG. 3) can be integrally molded with the turbine 110 so that the drive shaft 135 is fixed to the turbine 110 and extends downwardly from a lower face 119 (FIG. 10) of the turbine. In one example, the drive shaft 135 may comprise a rigid metallic shaft that is retained in a selected position adjacent to the female mold during the molding process. As such, the moldable polymer or composite material that is used to form the turbine 110 can engage with and affixed to one end of the drive shaft 135 during the molding process.

The method may also include one of the optional operations 220 and 230. For example, in operation 220, an electrical generator such as the permanent magnet generator 145 (FIG. 3) can be mounted for positioning between the turbine 110 and the base structure 150. As previously described in connection with FIG. 3, this operation 220 may include positioning the generator 145 in the housing shells 142 and 144 that are mounted over the lower housing shell 154 of the base structure 150. In another example, the operation 230 may include mounting a pump mechanism for positioning between the turbine 110 and the base structure 150. As previously described in connection with FIG. 3, this operation 230 may include positioning the pump mechanism in the housing shells 142 and 144 that are mounted over the lower housing shell 154 of the base structure 150.

Still referring to FIG. 12, the method 200 also includes mounting the vertical-axis turbine 110 to the base structure 150 such that the turbine 110 is configured to rotate relative to the base structure 150. For example, the turbine 110 may rotate about the vertical axis 115 relative to the base structure 150 in response to fluid flowing toward the turbine 110 in a flow direction that is generally perpendicular to the vertical axis 115. Also, the method 200 can include the operation 250 of preparing the base structure 150 (with the vertical-axis turbine mounted thereto) for anchoring into a floor 60 of a body of water. As previously described in connection with FIGS. 1-3, the base structure 150 can be equipped with a number of anchors 153 that are configured to secure the position of the turbine system 100 when it is positioned in a river, stream, ocean, or other body of water having water currents.

Figure 13A:
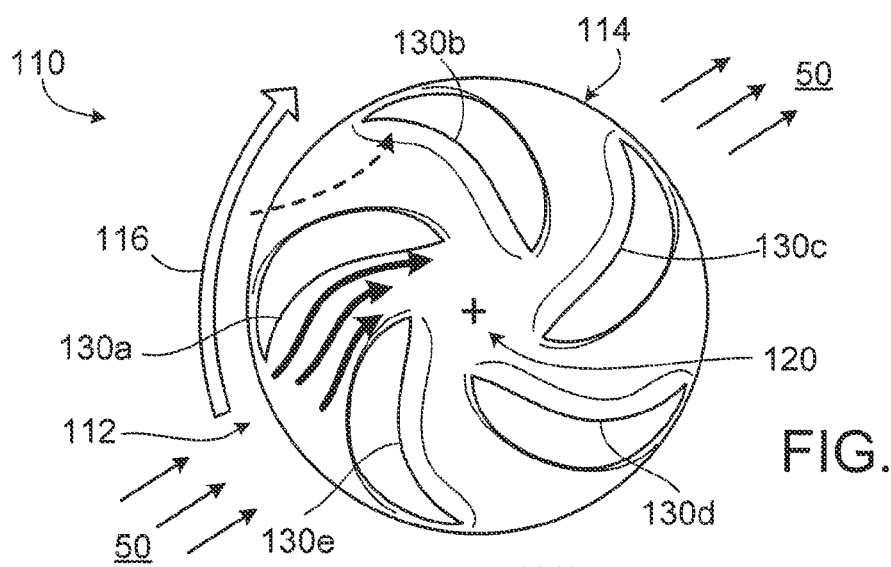
FIGS. 13A-C are top views of a rotation path of a turbine for use with a turbine system such as the system of FIG. 1, in accordance with some embodiments.
Figure 13B:
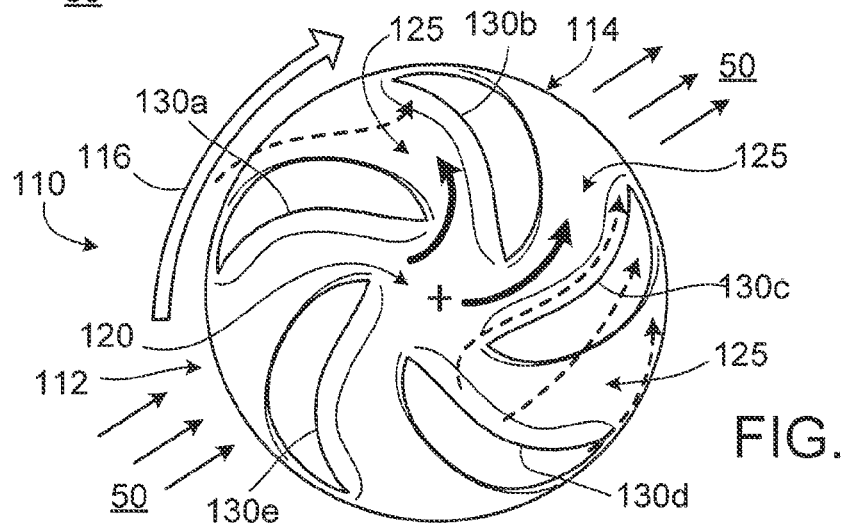
Figure 13C:
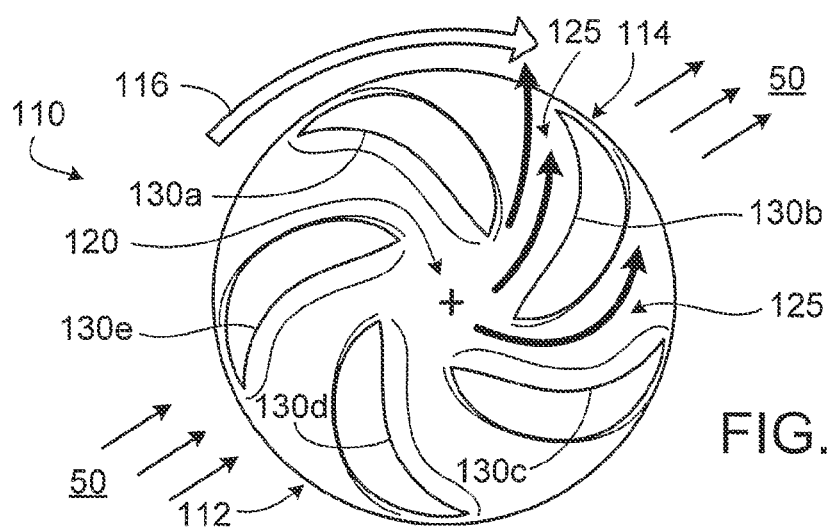

Referring now to FIGS. 13A-C, in use, the turbine system 100 can advantageously harness the energy from fluid flow in a manner that generates significant levels of electrical power even in relatively slow moving currents. In particular, the shape of the turbine 110 can provide a synergistic combination of Newtonian forces and a pressure recovery effect to drive the rotary motion 116 of the turbine 110. As such, the vertical-axis turbine 110 enables the turbine 110 to capture the kinetic energy from directional changes to the fluid flow more than once as the fluid flows over the upper face of the turbine.

For example, as shown in FIG. 13A, the fluid flow 50 can advanced toward the upstream portion 112 of the turbine 110 such that a portion of the fluid 50 is urged into the channel 125 at the upstream portion 112 (e.g., the channel 125 between the fins 130a and 130e in this example). The shape of the fins 130a-e and the bell-shaped contour 122 (FIG. 11) that at least partially defines the surfaces 120 and 126 can serve to manage or otherwise control the fluid flow through a number of intense directional changes along the upper face of the turbine 110. Here, the fluid 50 that is directed to flow into the channel 125 between the neighboring fins 130a and 130e acts upon at least the concave face 133 of the fin 130a so as to create Newtonian forces that urge the rotational motion 116 of the turbine 110. Thus, the fluid flow 50 acts upon the fins 130a-e in a first instance when the fluid flow 50 passes along the upstream portion of the turbine 112. Each of the channels includes a respective base surface 126 that leads to the upper convex surface 120. Accordingly, when the fluid flow 50 advances along the channel 125 as shown in FIG. 13A, the neighboring fins 130a and 130e serve to direct the fluid toward the upper convex surface 120. Also, in some circumstances, a secondary flow may enter another channel along the upstream portion 112 to act upon the concave surface of at least on fin (refer to the dotted line flow arrow acting upon fin 130b) to further urge rotation of the turbine 110.

As shown in FIG. 13B, while the fluid 50 flowing through the channels 125 along the upstream portion 112 is redirected by the fins 130a-e (thereby providing Newtonian forces that urge the rotation of the turbine 110), the fluid 50 is also traversing upward along the bell-shaped contour 112 (FIG. 11) of the base surfaces 126 of the channels 125 toward upper convex surface 120. This direction change of the fluid flow 50 stages the fluid for a pressure recovery effect along the downstream portion 114. Thus, the fluid flow 50 exits from the channel 125 along the upstream portion and travels over the top of the upper convex surface 120. At this stage, the fluid flow 50 begins its downward path along the bell-shaped contour 122 (FIG. 11) into one or more channels 125 along the downstream portion 114 of the turbine 110. It should be understood that, in particular flow conditions, some fluid flow may pass over the convex surfaces of one or more fins (refer to the dotted line flow arrows passing over fins 130c and 130d) during rotation of the turbine 110, yet the turbine 110 can continue to rotate in an efficient manner.

As shown in FIG. 13C, while fluid 50 is directed down the upper convex surface 120 and into one or more of the channels 125 at the downstream portion 114 of the turbine 110, the fluid again acts upon the concave surfaces of the respective fins (fins 130b and 130c in this depicted embodiment). Thus, these fins 130b and 130c at the downstream portion 114 of the turbine 110 again capture a directional change of the fluid flow to provide a second instance of Newtonian forces that urge the rotational motion 116 of the turbine 110. Moreover, as the fluid 50 moves in this path from the upper convex surface 120 to the downstream portion 114, a pressure recovery effect is induced in one or more of the channels 125 to develop the high pressure region 138 (refer also to FIG. 4) along the downstream portion 114 that contributes even greater power to act upon the respective fins 130b and 130c at the downstream portion 114 of the turbine. Thus, the shape of the turbine 110 (including the fins 130a-e, the upper convex surface 120, and the bell-shaped contour 122) may contribute to a synergistic combination of Newtonian forces and a pressure recovery effect to drive the rotary motion 116 of the turbine 110, which can advantageously provide significant rotational power even in relatively slow water currents.

For example, the turbine 110 can be configured to having the upper face that is about 7.9 feet in diameter (centered about the vertical axis of rotation) and can be used to generate mechanically rotary motion that is sufficient to produce significant levels of electrical power even when submerged in generally horizontal water current of a slow river or stream. In some embodiments, when the turbine system 100 (having the turbine 110 of about 7.9 feet in diameter) is submerged in a slow river or stream having a current of about 2 knots, the turbine may rotate at a speed of about 3.5 rpms while also generating mechanical rotary motion with significant shaft horsepower (e.g., sufficient to produce, for example, significant levels of electrical power or pumping power). Also, when the turbine system 100 (having the turbine 110 of about 7.9 feet in diameter) is submerged in a more moderate current of about 6 knots the turbine may rotate at a safe speed of about 11 rpms while also generating mechanical rotary motion with significant shaft horsepower (e.g., sufficient to produce, for example, significant levels of electrical power or pumping power). At these rotational speeds, the turbine 110 is believe to be generally safe for fish or other marine life while the turbine 110 operates to generate renewable energy in a river, stream, or ocean environment. In another example, the turbine 110 can be configured to having a main body that is about 12 feet in diameter (centered about the vertical axis of rotation) and can be used to generate mechanical rotary motion with significant shaft horsepower (e.g., sufficient to produce, for example, significant levels of electrical power) when submerged in ocean tidal currents flowing generally perpendicular to the vertical axis 115. In some embodiments, when the turbine system 100 (having the turbine 110 of about 12 feet in diameter) is submerged in ocean tidal currents, the turbine 110 may rotate at a speed that is safe for fish and other marine life while also generating mechanically rotary motion that is believed to be sufficient to produce significant levels of electrical power.

A number of embodiments of the invention have been described. Nevertheless, it will be understood that various modifications may be made without departing from the scope of the invention. Accordingly, other embodiments are within the scope of the following claims.

What is claimed is:

1. A turbine for use in generating electricity in an underwater environment, comprising:
a vertical-axis turbine configured to rotate about a vertical axis in response to water flowing toward the turbine in a flow direction that is generally perpendicular to the vertical axis;
the vertical-axis turbine including: a central upper dome surface at least partially defined by an upwardly convex curve in a vertical cross-sectional plane, and a plurality of upwardly protruding fins that each extend from an outer region proximate to an outer periphery of the vertical-axis turbine toward the central upper dome surface,
wherein the vertical-axis turbine has a maximum vertical height parallel to the vertical axis, the maximum vertical height being substantially smaller than a maximum diameter of the outer periphery of the vertical-axis turbine; and
wherein each of the fins include a convex face and an oppositely disposed concave face; wherein both the convex face and the concave face of each upwardly protruding fin are upwardly facing surfaces.

2. The turbine of claim 1, wherein the maximum vertical height of the vertical-axis turbine is measured parallel to the vertical axis from a lower level at the outer periphery to a higher level at a peak of the central upper dome surface.

3. The turbine of claim 1, wherein the vertical-axis turbine includes a continuously solid upward facing surface having a generally circular border at the outer periphery of the vertical axis turbine.

4. The turbine of claim 3, wherein each of the fins terminates at a vertical height below an uppermost region of the central upper dome surface.

5. The turbine of claim 4, wherein all of the upwardly protruding fins are positioned inwardly of the circular border and extend to the vertical height which is above the circular border.

6. The turbine of claim 1, wherein the maximum diameter of the outer periphery of the vertical-axis turbine is about 5 feet or greater.

7. The turbine of claim 1, wherein the central upper dome surface is symmetric about the vertical axis.

8. A turbine for use in generating electricity in an underwater environment, comprising:
a vertical-axis turbine configured to rotate about a vertical axis in response to water flowing toward the turbine in a flow direction that is generally perpendicular to the vertical axis;
the vertical-axis turbine including: a central upper dome surface at least partially defined by an upwardly convex curve in a vertical cross-sectional plane, and a plurality of upwardly protruding fins that each extend from an outer region proximate to an outer periphery of the vertical-axis turbine toward the central upper dome surface, each of the fins being integrally formed as a unitary structure with the central upper dome surface,
wherein the vertical-axis turbine has a maximum vertical height parallel to the vertical axis, the maximum vertical height being substantially smaller than a maximum diameter of the outer periphery of the vertical-axis turbine,
wherein the central upper dome surface is symmetric about the vertical axis; and wherein the plurality of fins are non-symmetric about the vertical axis, and wherein each of the fins include a convex face and an oppositely disposed concave face, and both the convex face and concave face of each upwardly protruding fin are upwardly facing surfaces.

9. The turbine of claim 1, wherein all of the upwardly protruding fins have substantially the same shape and size, and wherein the convex face and the oppositely disposed concave face intersect at a curved upper ridge.

10. The turbine of claim 9, wherein the concave face of each of the upwardly protruding fins terminates in a non-radial direction that extends toward an adjacent fin and away from the vertical axis.

11. The turbine of claim 1, wherein the plurality of upwardly protruding fins are arranged such that vertical-axis turbine that rotates in a first direction about the vertical axis both in response to fluid flowing over the turbine in a first flow direction that is generally perpendicular to the vertical axis and in response to fluid flowing over the turbine in a second opposite flow direction that is generally perpendicular to the vertical axis.

12. The turbine of claim 1, wherein, while each fin rotates to different positions about the vertical axis, each fin is configured to capture fluid flowing over the vertical-axis turbine, redirect the fluid along a path different from the ambient fluid flow, and contribute to the creation of a high pressure region on downstream portion of the vertical-axis turbine.

13. A turbine system for generating electrical power in an underwater environment, comprising:
a vertical-axis turbine configured to rotate about a vertical axis in response to water flowing toward the turbine in a flow direction that is generally perpendicular to the vertical axis, the vertical-axis turbine including: a central upper dome surface at least partially defined by an upwardly convex curve in a vertical cross-sectional plane, and a plurality of upwardly protruding fins that each include a convex face and an oppositely disposed concave face that intersect at a curved upper ridge, wherein the vertical-axis turbine has a maximum vertical height parallel to the vertical axis, the maximum vertical height being substantially smaller than a maximum diameter of an outer periphery of the vertical-axis turbine; and
a base structure positioned below the vertical-axis turbine to remain generally stationary during rotation of the vertical-axis turbine, the base structure comprising a plurality of anchor legs extending away from the vertical-axis turbine for a length that is greater than the maximum vertical height of the vertical axis turbine, and
wherein each of the fins include a convex face and an oppositely disposed concave face and both the convex face and concave face of each upwardly protruding fin are upwardly facing surfaces.

14. The system of claim 13, further comprising an electrical generator positioned between the vertical-axis turbine and the base structure so as to generate electrical power in response to the rotation of the vertical-axis turbine relative to the base structure.

15. The system of claim 14, further comprising an onshore electronics system electrically connectable to the electrical generator so as to condition the electrical power for output to an external power grid.

16. The system of claim 13, further comprising a pump mechanism positioned between the vertical-axis turbine and the base structure so as to force hydraulic fluid to an onshore generator systems in response to the rotation of the vertical-axis turbine relative to the base structure.

17. The system of claim 13, wherein the outer periphery of the vertical-axis turbine is defined by a diameter centered about vertical axis of about 5 feet or greater, wherein the central upper dome surface is symmetric about the vertical axis, and wherein the plurality of fins are non-symmetric about the vertical axis.

18. The system of claim 13, wherein each of the plurality of fins extend from an outer region proximate to the outer periphery of the vertical-axis turbine toward the central upper dome surface, wherein each of the fins directly joins with a lower region of the central upper dome surface such that an uppermost region of the central upper dome surface has a greater vertical height than each of the fins.

19. The system of claim 13, wherein each of the fins is integrally formed as a unitary structure with the central upper dome surface.

20. The system of claim 3, wherein the continuously solid upwardly facing surface includes the central upper dome surface, the plurality of upwardly protruding fins, and channel base surfaces between neighboring fins.

* * * * *